United States Patent
Wang et al.

(10) Patent No.: US 12,416,744 B2
(45) Date of Patent: Sep. 16, 2025

(54) 1.74 REFRACTIVE INDEX POLARIZED RESIN LENS AND PREPARATION METHOD THEREOF

(71) Applicants: JIANGSU CONANT OPTICAL CO., LTD, Nantong (CN); SHANGHAI CONANT OPTICAL CO., LTD, Shanghai (CN)

(72) Inventors: Chuanbao Wang, Nantong (CN); Yang Li, Nantong (CN); Wenyou Li, Nantong (CN); Tianniao Huang, Nantong (CN)

(73) Assignees: JIANGSU CONANT OPTICAL CO., LTD;, Nantong (CN); SHANGHAI CONANT OPTICAL CO., LTD, Shanghai (CN)

( * ) Notice: Subject to any disclaimer, the term of this patent is extended or adjusted under 35 U.S.C. 154(b) by 360 days.

(21) Appl. No.: 18/202,879

(22) Filed: May 26, 2023

(65) Prior Publication Data
US 2024/0210595 A1    Jun. 27, 2024

(30) Foreign Application Priority Data
Dec. 21, 2022   (CN) .......................... 202211648186.2

(51) Int. Cl.
*G02B 1/08*    (2006.01)
*G02B 1/04*    (2006.01)

(52) U.S. Cl.
CPC .............. *G02B 1/041* (2013.01); *G02B 1/08* (2013.01)

(58) Field of Classification Search
CPC ........ G02B 1/041; G02B 1/08; G02B 5/3033; G02C 7/12; B29C 39/10; C09J 175/04; B29L 2011/0016
USPC ........................................................ 359/642
See application file for complete search history.

(56) References Cited

U.S. PATENT DOCUMENTS

| | | | | |
|---|---|---|---|---|
| 8,746,879 B2 * | 6/2014 | Jiang | .................. | B29D 11/0073 351/139 |
| 2009/0091825 A1 * | 4/2009 | Saito | .................. | B29D 11/0073 252/585 |
| 2012/0236255 A1 * | 9/2012 | Jiang | ...................... | G02B 1/041 351/159.61 |
| 2013/0255860 A1 * | 10/2013 | Jiang | ................ | B29D 11/00125 156/154 |
| 2013/0278892 A1 * | 10/2013 | Jiang | ................ | B29D 11/00865 156/331.7 |
| 2019/0048237 A1 * | 2/2019 | Fan | ......................... | B32B 27/08 |
| 2022/0342235 A1 * | 10/2022 | Bouchier | ................ | G02C 7/14 |

* cited by examiner

*Primary Examiner* — William R Alexander
(74) *Attorney, Agent, or Firm* — Bayramoglu Law Offices LLC

(57) ABSTRACT

A 1.74 refractive index polarized resin lens and a preparation method thereof are provided. The lens includes upper and lower resin material layers with a refractive index of 1.74, a PVA polarizing film layer is arranged between the two resin material layers, and the surface of the PVA polarizing film is coated with a single monomer polyurethane binder. According to the present invention, the PVA polarizing film is added in the resin lens by pouring, so that the lens has a good adhesion property, and optical properties of the lens are not affected. The PVA polarizing film coated with the single monomer polyurethane binder is used to increase the adhesive force between the polarizing film and the upper and lower layers of the resin lens, and to avoid, in combination with a curing process, the falling of the PVA polarizing film.

11 Claims, No Drawings

1.74 REFRACTIVE INDEX POLARIZED RESIN LENS AND PREPARATION METHOD THEREOF

CROSS REFERENCE TO RELATED APPLICATIONS

This application is based upon and claims priority to Chinese Patent Application No. 202211648186.2 filed on Dec. 21, 2022, the entire contents of which are incorporated by reference herein.

TECHNICAL FIELD

The present invention belongs to the technical field of resin lenses, and more specifically relates to a 1.74 refractive index polarized resin lens.

BACKGROUND

With the increase of people's demands for life, ultraviolet rays in the sun and glare produced by uneven roads and water will cause discomfort and fatigue of eyes of people in the open air, and affect the clarity of sights. A polarized lens made according to a polarization principle of light rays can be used for effectively filtering scattered light rays in a light beam, isolating a large amount of ultraviolet rays and filtering polarized light by selectively filtering light rays in a certain direction, so as to achieve the effects of improving the color saturation and the edge clarity, effectively recognizing colors and reducing the irradiation of the ultraviolet rays into the pupils. However, the effects of the polarized lens are achieved based on polarizing films in a lens. The polarizing film is mostly a PVA film. In order to make the PVA film bonded to the upper and lower layers of the lens, the PVA film needs to be chemically treated. At present, main polarized lenses on the market have a refractive index of 1.499, 1.60 and 1.67. Due to special production raw materials and technologies, common binders are not applicable to 1.74 series polarized lenses.

SUMMARY

In view of the above defects, the present invention aims to provide a 1.74 refractive index polarized resin lens and disclose a preparation method thereof. A PVA polarizing film is added in a resin lens by pouring, so that the lens has a good adhesion property, and optical properties of the lens are not affected. The PVA polarizing film coated with a single monomer polyurethane binder is used to increase the adhesive force between the polarizing film and the upper and lower layers of the resin lens, and to avoid, in combination with a curing process, the falling of the PVA polarizing film.

In order to achieve the above objectives, the present invention is implemented by adopting the following technical solutions.

A polarized resin lens includes upper and lower resin material layers with a refractive index of 1.74, a PVA polarizing film layer is arranged between the two resin material layers, and the surface of the PVA polarizing film is coated with a single monomer polyurethane binder.

Preferably, the single monomer polyurethane binder has a solid content of 4.0%-8.0%, and the solid content can affect the effective residue of the binder on the film and the drying speed of the binder.

Preferably, the single monomer polyurethane binder includes one of aliphatic isocyanate or aromatic isocyanate as a monomer, and one of polyester polyol or polyether polyol as a catalyst.

Preferably, the single monomer polyurethane binder includes one or more of butanol, dimethylformamide, N-methylpyrrolidone, or propylene glycol methyl ether as a solvent.

Preferably, the upper resin material layer has a center thickness of 0.5-1.5 mm to ensure that the polarizing film will not be worn during subsequent processing.

The present invention further provides a preparation method of the 1.74 refractive index polarized resin lens. The method includes the following steps:

subjecting the PVA polarizing film to surface chemical treatment, and uniformly coating the two surfaces of the PVA polarizing film with the single monomer polyurethane binder;

fixing the PVA polarizing film coated with the single monomer polyurethane binder into a glass mold, and closing the mold;

pouring a raw resin material with a refractive index of 1.74 into the closed glass mold; and conducting curing molding.

Preferably, the surface of the PVA polarizing film is bent and shaped before the surface chemical treatment, and the bending degree of the PVA polarizing film is consistent with the upward bending degree of the glass mold.

Preferably, a surface chemical treatment method for the PVA polarizing film includes:

dip-coating the PVA polarizing film into a solution of the single monomer polyurethane binder for 5-15 seconds, and then taking out the PVA polarizing film at a uniform pulling rate of 13-25 mm/s. The dip-coating time and the pulling rate determine the thickness of a binder coating. When the thickness of the coating is greater, the adhesive force is better. However, when the thickness of the coating is greater, the static electricity is greater, and the drying time required is longer, affecting subsequent processing.

Preferably, after the chemical surface treatment, the PVA polarizing film is naturally dried and cured in an environment with a humidity of 30-50% at room temperature for 24-80 hours.

Compared with the prior art, the present invention has the following beneficial effects:

According to the present invention, the 1.74 refractive index polarized resin lens is prepared by using a soft film, and has a high polarization degree, which can reach 99% or above. Moreover, the PVA polarizing film coated with the single monomer polyurethane binder is used, so that the adhesive force between the polarizing film and the upper and lower layers of resin lenses is increased, and optical properties of the polarized resin lens are not affected.

According to the present invention, the thickness of the PVA film and the upper resin lens is limited to avoid the problem that the PVA film layer is worn during subsequent processing. Meanwhile, the bending degree of the PVA film and the upward bending degree of the mold are limited to avoid the problem that optical properties of the lens are not accurate due to inconsistent bending degree.

According to the preparation method of the present invention, the PVA polarizing film is added in the resin lens by pouring, so that the lens has a good adhesion property, and optical properties of the lens are not affected. The PVA film is further chemically treated to increase the adhesive force between the PVA film and the two layers of lenses, and avoid, in combination with a curing process, the falling of the PVA film. The present invention has simple and easy-to-operate preparation process and is easy to popularize.

DETAILED DESCRIPTION OF THE EMBODIMENTS

Preferred embodiments of the present invention are described in more detail below in conjunction with the accompanying drawings and specific examples.

Example 1

A polarized resin lens provided in this example includes upper and lower resin material layers with a refractive index of 1.74, a PVA polarizing film layer is arranged between the two 1.74 refractive index resin material layers, and the surface of the PVA polarizing film is coated with a single monomer polyurethane binder.

A preparation method of the 1.74 refractive index polarized resin lens provided in this example includes the following steps:
softening the PVA polarizing film, pressing the PVA polarizing film into 400 W by a film press, placing the PVA polarizing film in a film warehouse for natural shaping, and cutting the PVA polarizing film into a desired size by a film cutting machine;
chemical treatment of the polarizing film: completely immersing the PVA polarizing film in the single monomer polyurethane binder with a solid content of 6.0 for 8 seconds, after the immersion is completed, pulling out the polarizing film from the single monomer polyurethane binder at a uniform rate of 17 mm/s, and placing the polarizing film on a tray for natural drying and curing in an environment with a humidity of 30-50% at room temperature for 24-80 hours, where the single monomer polyurethane binder includes aliphatic isocyanate as a monomer, polyester polyol as a catalyst, and butanol as a solvent;
after the placement for drying, fixing the PVA polarizing film between two glass molds with a small plastic ring made from a polymer material, and bonding the glass molds and the small plastic ring with an adhesive tape for mold closing, where the upward bending mold has a bending degree of 400 W, and the center thickness of the PVA polarizing film from the upward bending mold is 1 mm; and
after conducting pouring (an MR-174 raw material, Mitsui) and curing on the closed molds, taking out the molds from a furnace, opening the molds, and then conducting primary edging, secondary edging, cleaning and inspection to obtain the 1.74 refractive index polarized resin lens meeting requirements.

Example 2

A polarized resin lens provided in this example includes upper and lower resin material layers with a refractive index of 1.74, a PVA polarizing film layer is arranged between the two 1.74 refractive index resin material layers, and the surface of the PVA polarizing film is coated with a single monomer polyurethane binder.

A preparation method of the 1.74 refractive index polarized resin lens provided in this example includes the following steps:
softening the PVA polarizing film, pressing the PVA polarizing film into 600 W by a film press, placing the PVA polarizing film in a film warehouse for natural shaping, and cutting the PVA polarizing film into a desired size by a film cutting machine;
chemical treatment of the polarizing film: completely immersing the PVA polarizing film in the single monomer polyurethane binder with a solid content of 5.5 for 6 seconds, after the immersion is completed, pulling out the polarizing film from the single monomer polyurethane binder at a uniform rate of 15 mm/s, and placing the polarizing film on a tray for natural drying and curing in an environment with a humidity of 30-50% at room temperature for 24-80 hours, where the single monomer polyurethane binder includes aromatic isocyanate as a monomer, polyether polyol as a catalyst, and dimethylformamide as a solvent;
after the placement for drying, fixing the PVA polarizing film between two glass molds with a small plastic ring made from a polymer material, and bonding the glass molds and the small plastic ring with an adhesive tape for mold closing, where the upward bending mold has a bending degree of 600 W, and the center thickness of the PVA polarizing film from the upward bending mold is 0.7 mm; and
after conducting pouring (an MR-174 raw material, Mitsui) and curing on the closed molds, taking out the molds from a furnace, opening the molds, and then conducting primary edging, secondary edging, cleaning and inspection to obtain the 1.74 polarized resin lens meeting requirements.

Example 3

A polarized resin lens provided in this example includes upper and lower resin material layers with a refractive index of 1.74, a PVA polarizing film layer is arranged between the two 1.74 refractive index resin material layers, and the surface of the PVA polarizing film is coated with a single monomer polyurethane binder.

A preparation method of the 1.74 refractive index polarized resin lens provided in this example includes the following steps:
softening the PVA polarizing film, pressing the PVA polarizing film into 800 W by a film press, placing the PVA polarizing film in a film warehouse for natural shaping, and cutting the PVA polarizing film into a desired size by a film cutting machine;
chemical treatment of the polarizing film: completely immersing the PVA polarizing film in the single monomer polyurethane binder with a solid content of 6.5 for 10 seconds, after the immersion is completed, pulling out the polarizing film from the single monomer polyurethane binder at a uniform rate of 15 mm/s, and placing the polarizing film on a tray for natural drying and curing in an environment with a humidity of 30-50% at room temperature for 24-80 hours, where the single monomer polyurethane binder includes aliphatic isocyanate as a monomer, polyether polyol as a catalyst, and N-methylpyrrolidone as a solvent;
after the placement for drying, fixing the PVA polarizing film between two glass molds with a small plastic ring made from a polymer material, and bonding the glass molds and the small plastic ring with an adhesive tape for mold closing, where the upward bending mold has a bending degree of 800 W, and the center thickness of the PVA polarizing film from the upward bending mold is 0.7 mm; and after conducting pouring (an MR-174 raw material, Mitsui) and curing on the closed molds, taking out the molds from a furnace, opening the molds, and then conducting primary edging, secondary edging, cleaning and inspection to obtain the 1.74 refractive index polarized resin lens meeting requirements.

Example 4

A polarized resin lens provided in this example includes upper and lower resin material layers with a refractive index of 1.74, a PVA polarizing film layer is arranged between the two 1.74 refractive index resin material layers, and the surface of the PVA polarizing film is coated with a single monomer polyurethane binder.

A preparation method of the 1.74 refractive index polarized resin lens provided in this example includes the following steps:

softening the PVA polarizing film, pressing the PVA polarizing film into 200 W by a film press, placing the PVA polarizing film in a film warehouse for natural shaping, and cutting the PVA polarizing film into a desired size by a film cutting machine;

chemical treatment of the polarizing film: completely immersing the PVA polarizing film in the single monomer polyurethane binder with a solid content of 6.5 for 10 seconds, after the immersion is completed, pulling out the polarizing film from the single monomer polyurethane binder at a uniform rate of 19 mm/s, and placing the polarizing film on a tray for natural drying and curing in an environment with a humidity of 30-50% at room temperature for 24-80 hours, where the single monomer polyurethane binder includes aromatic isocyanate as a monomer, polyester polyol as a catalyst, and propylene glycol methyl ether as a solvent;

after the placement for drying, fixing the PVA polarizing film between two glass molds with a small plastic ring made from a polymer material, and bonding the glass molds and the small plastic ring with an adhesive tape for mold closing, where the upward bending mold has a bending degree of 200 W, and the center thickness of the PVA polarizing film from the upward bending mold is 1.1 mm; and after conducting pouring (an MR-174 raw material, Mitsui) and curing on the closed molds, taking out the molds from a furnace, opening the molds, and then conducting primary edging, secondary edging, cleaning and inspection to obtain the 1.74 refractive index polarized resin lens meeting requirements.

Comparative Example 1

With reference to Example 1, a 1.74 refractive index polarized resin lens was prepared, except that the chemical treatment was not conducted on the polarizing film, mold closing was directly conducted, and other steps were the same.

Comparative Example 2

With reference to Example 1, a 1.74 refractive index polarized resin lens was prepared, except that the single monomer polyurethane binder was changed into a binder commonly used in a manufacturing process of a 1.499 polarized lens, and other steps were the same.

Comparative Example 3

With reference to Example 1, a 1.74 refractive index polarized resin lens was prepared, the solid content of the single monomer polyurethane binder was changed into 3.5, and other steps were unchanged.

Comparative Example 4

With reference to Example 1, a 1.74 refractive index polarized resin lens was prepared, the pulling rate after the immersion was changed into 10, and other steps were unchanged.

Comparative Example 5

With reference to Example 1, a 1.74 refractive index polarized resin lens was prepared, the center thickness of the polarizing film from the upward bending mold was changed into 1.5 mm, and other steps were unchanged.

An adhesive force test was carried out on the lenses in the examples and comparative examples above separately. Results are as shown in Table 1.

TABLE 1

Comparison of properties of lenses in examples and comparative examples

| Sample | Adhesive force test | Problem during processing |
| --- | --- | --- |
| Example 1 | Qualified | OK |
| Example 2 | Qualified | OK |
| Example 3 | Qualified | OK |
| Example 4 | Qualified | OK |
| Comparative Example 1 | Unqualified | Film falling |
| Comparative Example 2 | Unqualified | Film falling |
| Comparative Example 3 | Unqualified | Film falling |
| Comparative Example 4 | Unqualified | Film falling |
| Comparative Example 5 | Qualified | Polarizing film worn |

Note: The adhesive force test is carried out by adding 4.5% sodium chloride to pure water, conducting boiling for 60 minutes, and observing whether falling occurs. The problem during processing includes the problems that whether the polarizing film layer is worn and falls.

From the above table, it can be seen that the film layer of the 1.74 refractive index polarized resin lens prepared by the present invention has a good adhesive force and is difficult to fall off. Moreover, the center thickness of the polarizing film from the upward bending mold is controlled, such that the problem that the polarizing film is worn during subsequent processing is avoided.

The examples of the present invention have been described above, and the descriptions above are exemplary and not exhaustive and are not limited to the examples disclosed herein. A variety of modifications and changes made without departing from the scope and technical principle of the examples described are obvious to persons of ordinary skill in the technical field, and all the modifications and changes shall also be deemed as the protection scope of the present invention.

What is claimed is:

1. A 1.74 refractive index polarized resin lens, comprising upper and lower resin material layers with a refractive index of 1.74, a PVA polarizing film layer being arranged between the two resin material layers, and the surface of the PVA polarizing film being coated with a single monomer polyurethane binder, wherein the single monomer polyurethane binder has a solid content of 4.0%-8.0%.

2. The 1.74 refractive index polarized resin lens according to claim 1, wherein the single monomer polyurethane binder comprises one or more of butanol, dimethylformamide, N-methylpyrrolidone, or propylene glycol methyl ether as a solvent.

3. The 1.74 refractive index polarized resin lens according to claim 1, wherein an upper resin material layer has a center thickness of 0.5-1.5 mm.

4. A 1.74 refractive index polarized resin lens, comprising upper and lower resin material layers with a refractive index of 1.74, a PVA polarizing film layer being arranged between the two resin material layers, and the surface of the PVA polarizing film being coated with a single monomer polyurethane binder, wherein the single monomer polyurethane binder comprises one of aliphatic isocyanate or aromatic isocyanate as a monomer, and/or one of polyester polyol or polyether polyol as a catalyst.

5. A preparation method of a 1.74 refractive index polarized resin lens, wherein the 1.74 refractive index polarized resin lens comprises upper and lower resin material layers with a refractive index of 1.74, a PVA polarizing film layer being arranged between the two resin material layers, and the surface of the PVA polarizing film being coated with a single monomer polyurethane binder;

wherein the preparation method comprises the following steps:

subjecting the PVA polarizing film to surface chemical treatment, and uniformly coating the two surfaces of the PVA polarizing film with the single monomer polyurethane binder;

fixing the PVA polarizing film coated with the single monomer polyurethane binder into a glass mold, and closing the mold;

pouring a raw resin material with a refractive index of 1.74 into the closed glass mold; and conducting curing molding.

6. The preparation method of the 1.74 refractive index polarized resin lens according to claim 5, wherein the surface of the PVA polarizing film is bent and shaped before the surface chemical treatment, and/or the bending degree of the PVA polarizing film is consistent with an upward bending degree of the glass mold.

7. The preparation method of the 1.74 refractive index polarized resin lens according to claim 5, wherein a surface chemical treatment method for the PVA polarizing film comprises:

dip-coating the PVA polarizing film into the single monomer polyurethane binder for 5-15 seconds, and then taking out the PVA polarizing film at a uniform pulling rate of 13-25 mm/s.

8. The preparation method of the 1.74 refractive index polarized resin lens according to claim 5, wherein the single monomer polyurethane binder has a solid content of 4.0%-8.0%; and/or the single monomer polyurethane binder comprises one of aliphatic isocyanate or aromatic isocyanate as a monomer, and/or one of polyester polyol or polyether polyol as a catalyst.

9. The preparation method of the 1.74 refractive index polarized resin lens according to claim 5, wherein after the chemical surface treatment, the PVA polarizing film is naturally dried and cured in an environment with a humidity of 30-50% at room temperature for 24-80 hours.

10. The preparation method of the 1.74 refractive index polarized resin lens according to claim 5, wherein the single monomer polyurethane binder comprises one or more of butanol, dimethylformamide, N-methylpyrrolidone, or propylene glycol methyl ether as a solvent.

11. The preparation method of the 1.74 refractive index polarized resin lens according to claim 5, wherein an upper resin material layer has a center thickness of 0.5-1.5 mm.

\* \* \* \* \*